W. T. BONNER.
FRICTION MEMBER.
APPLICATION FILED JUNE 5, 1908.
903,049. Patented Nov. 3, 1908.
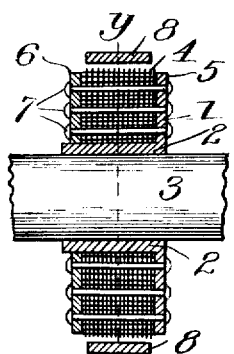
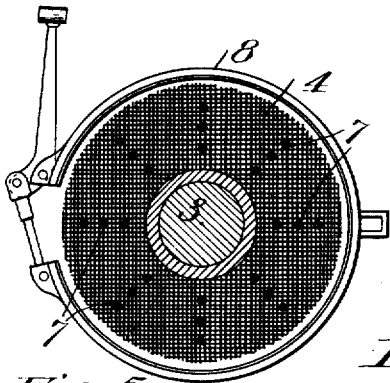
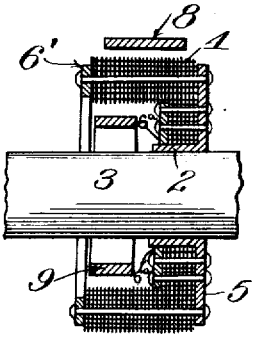
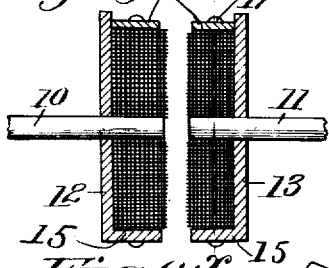
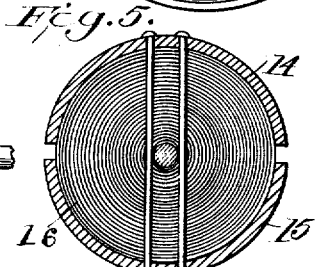
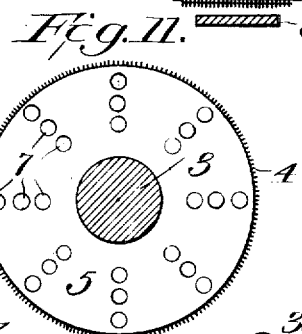
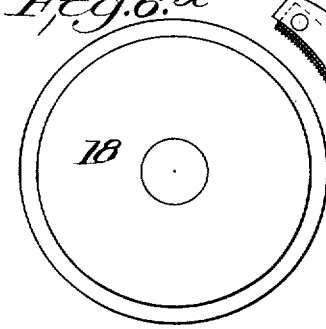
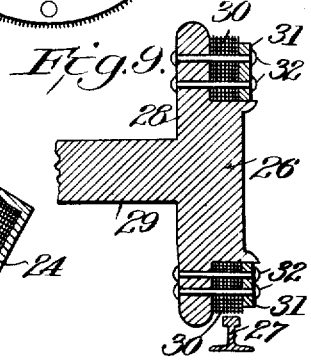
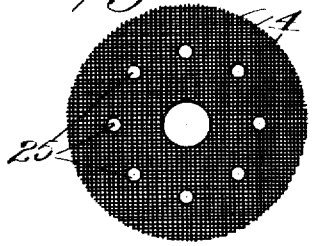
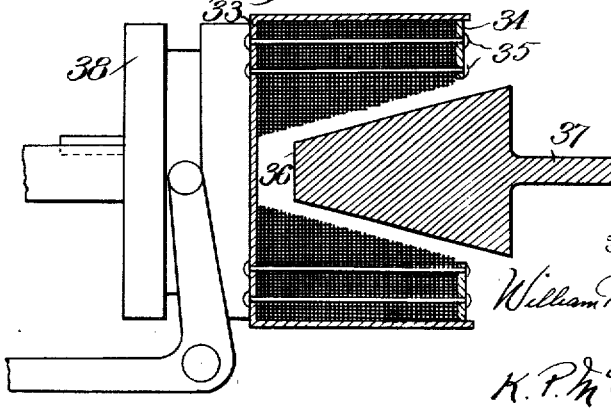
Witnesses
Inventor
William T. Bonner
K. P. McElroy
Attorney

UNITED STATES PATENT OFFICE.

WILLIAM T. BONNER, OF WASHINGTON, NORTH CAROLINA.

FRICTION MEMBER.

No. 903,049.　　　　Specification of Letters Patent.　　　Patented Nov. 3, 1908.

Application filed June 5, 1908. Serial No. 436,922.

*To all whom it may concern:*

Be it known that I, WILLIAM T. BONNER, a citizen of the United States, residing at Washington, in the county of Beaufort and State of North Carolina, have invented certain new and useful Improvements in Friction Members, whereof the following is a full, clear, and exact specification.

This invention relates to friction members; and comprises a friction element composed of a plurality of layers of wire fabric assembled and maintained under transverse compressive strain, said friction element being assembled with a holding element in such manner as to cause the edges of such layers to be exposed to form a frictional surface adapted for engagement with a coöperating friction member; all as more fully hereinafter set forth and as claimed.

In brakes and like frictional members intended for exceptionally heavy duty, it has hitherto hardly been practical to use built-up structures of materials having a high coefficient of friction for the reason that most such materials have relatively little tensile strength and under the heavy shearing strains of a high-duty brake they soon wear or tear out. Therefore, such high-duty brakes and coöperating parts are generally made of simple integral metal, the brake being machined to fit such coöperating part, whether wheel, hub or other element. This however, gives a friction with the grain instead of across the grain, as is desirable; and, moreover, the production of heat in such brakes being ordinarily great, with the increase of temperature and the corresponding expansion of the metal, the fit tends to disappear as the work required of the brake increases; or, in other words, the efficiency of the device diminishes with the increase of demands upon it. Furthermore, the coöperating fitted integral metal parts, if not smooth surfaced at first, soon become so, hard metals abrading and softer wearing down, thereby diminishing friction in engagements under moderate pressures and necessitating locking pressures to secure good breaking effects.

The object of the present invention is to provide a simple, strong and efficient friction member free of the stated disadvantages and having certain new advantages. To this end, the friction member is made of a series of strata or layers of wire fabric compressed into a block and maintained in such form by suitable compression means, the edges or ends of such strata being trued off to form a friction surface. The wire fabric employed may be of any suitable metal, such as steel, iron, brass, bronze, etc., and the fabric itself may be made in any of the ordinary ways, woven, knitted, etc. Expanded metal is less suitable. Preferably, the wire fabric is as closely woven or knitted as practicable, ordinary wire gauze being rather more open in texture than is desirable though it may of course be used.

With a friction block or mass made in the way described, the ends of the wires running at a right or other angle to the friction surface give a friction across the grain for a coöperating friction member while the wires running more or less parallel to such surface serve to give lateral support to such angling wires and prevent lateral displacement or brushing whatever the duty imposed on the brake or other friction member. By assembling the several layers or strata under heavy pressure and maintaining this compression in the finished article, the angling wires are further fixed against displacement while the block or mass as a whole is given sufficient mechanical strength to withstand any shearing strain that is likely to be given in high-duty braking. Obviously, whatever the wear on such a friction surface as is described, the surface will always present a cross-grain to the coöperating friction member, and, the coefficient of friction on such a surface being very high, any desired degree of frictional engagement may be secured beween no-engagement and locking engagement—something which is not practicable with machined friction members.

My improved friction member is particularly desirable for such severe duty as in automobile brakes where a relatively small sleeve or hub must ordinarily take the entire strain in stopping a heavy vehicle and where graduated degrees of friction or engagement are imperatively necessary, both in controlling the speed of the vehicle and in stopping it, a locking engagement of such a small sleeve or hub with the braking means being impracticable. In such work, the strains and shearing stresses are very great, but with the improved friction member of the present invention, the frictional engagement may be as gradually increased as is desired, every addition of pressure increasing proportionately the engagement while the block itself is mechanically strong enough to stand any shearing stress which is likely to be applied. The device is, however, equally well adapted to lighter work and may be used in any relation where frictional engagement is desired, as in friction gear, pulleys and rollers, car wheels, driving wheels, friction clutches, gripping devices, etc. In braking devices, either the braking face of the element in motion or the face of the braking element proper may be provided with my new device.

In the accompanying illustration, I have shown, more or less diagrammatically, sundry embodiments of my invention out of the many possible.

In this showing, Figure 1 is a vertical section of a brake spool or hub; Fig. 2 is a similar view of another form; Fig. 3 is a vertical section of the structure of Fig. 1 taken along line $y$—$y$ of that figure; Fig. 4 shows a pair of friction clutches engaging on flat faces; Fig. 5 is a vertical section of one of the elements of Fig. 4 on line $x$—$x$; Fig. 6 shows a car wheel provided with a braking element according to the present invention; Fig. 7 shows a brake spool or a roller and brake both built up of laminated wire fabric; Fig. 8 is a view on an enlarged scale of a wire-gauze or wire fabric annulus showing the mutual support afforded by the wires for the present use; Fig. 9 is a view of a built-up car wheel having a tread according to the present invention; Fig. 10 is a view of a coned brake sleeve engaging a coned shaft; and Fig. 11 is an end elevation of the rear end of either Fig. 1 or Fig. 2.

Referring first to the showing of Fig 1, this shows a friction sleeve, indicated as a whole by reference character 1, mounted on a sleeve 2, keyed to shaft 3, this shaft being one which it is desirable to brake. It may, for instance, be an axle of an automobile. The friction sleeve consists of a number of wire-fabric annuli, 4, (for the sake of clearness illustration shown as woven wire gauze of exaggerated coarseness of mesh) held under compression between fixed collar 5 and follower 6 by rivets 7, and is made by slipping the desired number of annuli over sleeve 2 against 5, putting on the follower, compressing the assemblage in a hydraulic press and riveting while under compression. Or collar, annuli and follower may be bolted together while still in the press, the assemblage removed and the bolts successively removed and replaced by rivets. The friction sleeve so made has its outer surface turned down to a true cylinder in a lathe. Element 8 represents a simple strap brake adapted to engage the friction sleeve.

Fig. 2 represents the same structure modified to give a double braking surface, as for the use of both a power brake and a hand brake on an automobile. In this figure, the follower 6' is a simple ring and half or more of the wire gauze or fabric annuli are similarly cut out, permitting braking element 9 an interior engagement. A similar follower ring, 6ª, is used to assemble and support the wire fabric beyond the cut-away portion.

In Fig. 3, the elements shown are the same as in Fig. 1, element 8 being shown as a simple form of strap brake.

In Figs. 4 and 5, the friction surface is disklike, elements 10 and 11 representing driven and driving shafts, if the structure shown be used as a clutch, or driving shaft and braking member if the structure be used as a brake. The two shafts shown are each provided with a platelike enlargement, respectively marked 12 and 13, carrying members having frictional engagement on their faces. These elements, as shown, have semi-annular collars, 14 and 15, 14 acting as a follower and 15 as a fixed collar containing spirals (see Fig. 5) or annuli 16, of wire fabric, held under compressive tension by rivets 17. A long strip of wire gauze (see Fig. 5) may be helically wound about shaft 11 under great tension, riveted while still under tension and the face trued off in a lathe. Holding elements or semi-annular collars 14 and 15 may be omitted, but are desirable.

Fig. 6 shows an ordinary wheel 18 having brake 19 coöperating with its tread. This brake consists of holding element 20 containing a built-up block of wire-fabric elements 21, secured under compressive tension by rivets 22. These elements may be, as shown, crescent shaped, and are assembled in the manner described for the annuli of Fig. 1, the concave braking surface being afterwards trued by any suitable tool.

Fig. 7 shows a section of a rotary element 23, such as a friction roller, and a brake shoe 24, both built up of assembled layers or strata of wire fabric.

Fig. 8 shows one of the annuli of Fig. 1 on a somewhat larger scale, showing orifices 25 for bolts or rivets and also the mutual support afforded each other by the wires of the fabric in this use.

Fig. 9 shows a drive or other wheel 26, running on track rail 27. This wheel is composed of flanged body portion 28, axle 29, assembled annular wire fabric layers 30, forming a friction surface at their edges for the tread of the wheel, movable follower ring 31 and rivets 32 for securing and maintaining compression of said layers.

Fig. 10 shows a simple form of friction brake, a series of wire fabric rings being secured to collar 33 and follower 34 by rivets 35 and internally shaped to form a conical cavity engaging the coned end 36 of shaft 37, engagement being secured by toggle joint means 38.

In all the forms of the friction element shown, it will be seen that the friction surface is formed by the ends of the wires of the wire-fabric lying at a right or other angle to such surface, while these wires are braced and secured in position by the crossing wires and also by the compressive strain on the whole body exercised by the rivets or bolts, acting in opposition to the natural resiliency of the fabric layers. Cross friction is therefore secured and however much the friction surface may wear down, the same will always be true. The built-up structure being all metal and shearing stresses being opposed by the great tensile strength of the material, it has a long life and is substantially as strong as an integral metal device while having far superior frictional properties.

While the described wire fabric friction element after forming may be impregnated with cementing and filling material, such as india rubber, vulcanized after impregnation, this is hardly necessary or desirable with the preferable close-woven or knitted wire fabrics.

Preferably, the degree of hydraulic pressure employed in uniting the wire fabric layers should be rather high; sufficiently high to mash flat the several layers and unite their lateral faces by a kind of interlocking contact; and this high degree of compression should be maintained by the rivets, bolts or other uniting means.

What I claim is:—

1. A friction element comprising a series of parallel, contacting layers of wire fabric, the exposed edges of said layers being trued and forming a friction surface.

2. A friction element comprising a series of parallel, contacting layers of wire fabric under transverse compression, the exposed edges of said layers being trued and forming a friction surface.

3. A friction element comprising a series of parallel, contacting layers of wire fabric under transverse compression and a holding element for said layers, the exposed edges of said layers being trued and forming a friction surface.

4. A friction element comprising a series of parallel, contacting annuli of wire fabric, a holding element on each side of the composite annulus so formed and means extending through the annulus and holding elements to secure them together under transverse compression, the exposed edges of said annuli together forming a friction surface.

5. A cylindrical friction element comprising a cylinder comprising parallel, contacting layers of wire fabric and means holding said layers under transverse compression, the edges of said layers forming a circumferential friction surface.

6. A braking element comprising a shaft, and a series of layers of wire fabric in parallel contacting relation mounted thereon, the exposed edges of said layers being trued and constituting a friction surface.

7. In a brake, the combination of a braking element and an element to be braked, one of said elements being provided with a series of parallel, contacting layers of wire fabric and the exposed edges of said layers constituting a friction surface in coöperative relationship with the other element.

8. In a brake, the combination of a braking element with an element to be braked, said latter element carrying a series of parallel, contacting layers of wire gauze having their exposed edges trued and formed into a friction surface in coöperative relationship with said braking element.

9. In a brake, the combination of a braking element with a shaft carrying a series of parallel, contacting wire fabric annuli under transverse compression, the exposed edges of such annuli constituting a friction surface and being in coöperative relationship to said braking element.

10. In an automobile brake, the combination of a braking element with an axle carrying a cylindrical series of parallel, contacting disks of wire fabric, the edges of said disks forming a circumferential friction surface in coöperative relationship to said braking element.

11. In an automobile brake, the combination of an axle carrying a sleeve provided with an encircling annular series of wire fabric layers, exposed edges of said layers forming a circumferential friction surface, with a braking element in coöperative relationship to said friction surface.

12. In a braking element, the combination of a sleeve, a collar rigid therewith, a follower collar movably mounted thereon, a series of wire fabric annuli encircling said sleeve between said collars and transverse tension means maintaining said annuli in a state of compression between said collars.

In testimony whereof, I affix my signature in the presence of two subscribing witnesses.

WILLIAM T. BONNER.

Witnesses:
Jas. C. Buckman,
R. F. Butler.